(12) United States Patent
Aundal (10) Patent No.: US 6,904,809 B1
(45) Date of Patent: Jun. 14, 2005

(54) MAGNETIC FLOWMETER WITH INTEGRAL LIQUID TRAP

(75) Inventor: Knud Torp Aundal, Roskilde (DK)

(73) Assignee: Medtronic, Inc., Minneapolis, MN (US)

( * ) Notice: Subject to any disclaimer, the term of this patent is extended or adjusted under 35 U.S.C. 154(b) by 17 days.

(21) Appl. No.: 10/836,648

(22) Filed: Apr. 30, 2004

(51) Int. Cl.⁷ .............................................. G01F 1/56
(52) U.S. Cl. ................................................ 73/861.08
(58) Field of Search .................... 73/861.08, 861, 73/861.74; 373/151, 142

(56) References Cited

U.S. PATENT DOCUMENTS

| | | | |
|---|---|---|---|
| 4,008,609 A | | 2/1977 | Lambrecht et al. |
| 4,099,412 A | | 7/1978 | Nehrbass |
| 4,118,981 A | | 10/1978 | Cave |
| 4,145,924 A | | 3/1979 | Müller |
| 4,434,667 A | | 3/1984 | August et al. |
| 4,683,748 A | | 8/1987 | Carter |
| 4,732,160 A | | 3/1988 | Ask et al. |
| 4,881,413 A | | 11/1989 | Georgi et al. |
| 4,899,592 A | | 2/1990 | Behrens |
| 5,046,510 A | | 9/1991 | Ams et al. |
| 5,062,304 A | * | 11/1991 | Van Buskirk et al. ........ 73/861 |
| 5,078,012 A | * | 1/1992 | Ding et al. .............. 73/861.74 |
| 5,176,148 A | | 1/1993 | Wiest et al. |
| 5,207,105 A | | 5/1993 | Fukunaga et al. |
| 5,325,728 A | | 7/1994 | Zimmerman et al. |
| 5,327,787 A | | 7/1994 | Kiene et al. |
| 5,495,854 A | | 3/1996 | Currie |
| 5,708,212 A | | 1/1998 | Batey |
| 6,237,424 B1 | | 5/2001 | Salmasi et al. |
| 6,463,807 B1 | | 10/2002 | Feller |
| 6,507,598 B2 | * | 1/2003 | Tsuda et al. ................ 373/142 |
| 6,507,599 B2 | * | 1/2003 | Tsuda et al. ................ 373/151 |

OTHER PUBLICATIONS

CADILLAC® Magnetic Flowmeter General Information, Central Station Steam Co., revision 1001, p. 5.
Working With Flowmeters in Liquid Flowmeters, downloaded from internet website http://www.omega.com/techref/flowcontrol.html.
Danfoss Industriel Instrumentering, Simply More, Product Brochure, 5 pages, Denmark.
Bailey, Fischer & Porter, Electromagnetic flowmeter, made of stainless steel with pulsed DC technology and integrally mounted converter (compact), Product Descriptions, pp. 1-7.

(Continued)

Primary Examiner—Edward Lefkowitz
Assistant Examiner—Jewel V. Thompson
(74) Attorney, Agent, or Firm—IPLM Group, P.A.

(57) ABSTRACT

An integral trap magnetic flowmeter having an inlet in fluid communication with a sensing passage, the sensing passage intersecting a magnetic field, having electrodes for detecting a flow-dependent voltage induced by the passage of conductive liquid through the magnetic field, and having an outlet at an elevation such that the sensing passage volume normally remains filled with conductive liquid. By maintaining standing liquid in the sensing passage at a height sufficient to fill the sensing passage volume, the flowmeter's response may be made more rapid and more accurate, particularly during the early stages of a short duration liquid discharge. By providing an integral trap, installation errors may be reduced.

42 Claims, 7 Drawing Sheets

OTHER PUBLICATIONS

Medtronic, Inc., Duet® Logic G/2 Product Brochure, 2002.
Beli Technics BV, Beli Technics Brochure, The Netherlands, 6 pages.
Medtronic, Inc., Urodyn® 1000 Accurate Uroflowmetry a Matter of Simple Convenience Product Brochure with Spinning Disk, 4 pages, 2000.
Medtronic, Inc., Urodyn® 1000 Portable Alternative in Uroflow Technology Product Brochure with Weight Cell, 2 pages, 2000.
Endress+ Hauser GmbH+ Co., Durchflussmesser Flowtec Product Specification, 8 pages.
Endress+ Hauser Gmbh+ Co., Magpac DMI 6230 Product Specification, 6 pages.
Laborie Medical Technologies, Urocap Product Brochure.
Medical Measurement Systems, Uroflowmeter Brochure with Weight Cell, 1 page, Holland.
Andromeda, Ellipse-The modular concept for precise urodynamics, 8 pages.

* cited by examiner

MAGNETIC FLOWMETER WITH INTEGRAL LIQUID TRAP

TECHNICAL FIELD

This invention relates to liquid flow rate measurement.

BACKGROUND

Flowmeters are used to measure liquid flow rates or volumes. A variety of devices have been employed, including weight cells, rotameters, spinning disk or spinning rotor sensors, capacitive sensors, pressure sensors and Faraday effect sensors. References describing such devices include U.S. Pat. Nos. 4,008,609, 4,099,412, 4,118,981, 4,145,924, 4,434,667, 4,683,748, 4,732,160, 4,881,413, 4,899,592, 5,046,510, 5,062,304, 5,078,012, 5,176,148, 5,207,105, 5,325,728, 5,327,787, 5,495,854, 5,708,212, 6,237,424 B1 and 6,463,807 B1.

SUMMARY OF THE INVENTION

Figure 15:
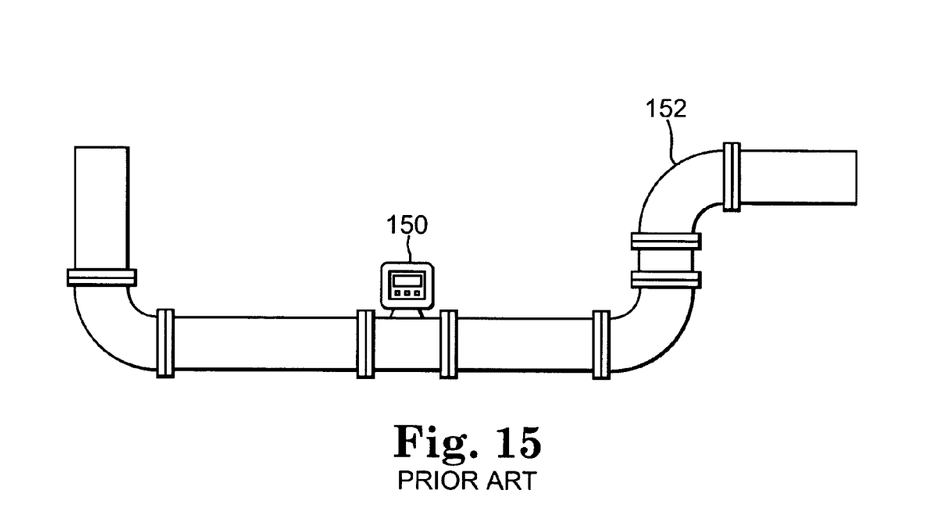
FIG. 15 is a side schematic view of a prior art "wet leg" flowmeter installation.

Magnetic flowmeters are sometimes installed in horizontal pipe runs using a "wet leg" plumbing technique that keeps the flowmeter full of liquid. One such recommended installation is shown in *Cadillac® Magnetic Flowmeter General Information*, Central Station Steam Co., revision 1001, page 5. FIG. 15 shows a similar installation for flowmeter 150 installed in pipe run 152. If improperly installed, the flowmeter may not be filled with liquid and the flowmeter's accuracy may be compromised. Installation mistakes may arise for a variety of reasons, see "WORKING WITH FLOWMETERS" in *Liquid Flowmeters*, http://www.omega.com/techref/flowcontrol.html. Improvements in one or more factors such as simplicity in construction or installation, compactness, electrical isolation, speed of response or accuracy would be desirable in such magnetic flowmeter devices.

The invention provides, in one aspect, an integral trap magnetic flowmeter comprising an inlet in fluid communication with a sensing passage, the sensing passage intersecting a magnetic field, having electrodes for detecting a flow-dependent voltage induced by the passage of conductive liquid through the magnetic field, and having an outlet at an elevation such that the sensing passage volume normally remains filled with conductive liquid.

The invention provides, in another aspect, a method for measuring liquid flow comprising (a) passing a stream of conductive liquid through an integral trap magnetic flowmeter comprising an inlet in fluid communication with a sensing passage, the sensing passage intersecting a magnetic field, having electrodes for detecting a flow-dependent voltage induced by the passage of conductive liquid through the magnetic field, and having an outlet at an elevation such that the sensing passage volume normally remains filled with conductive liquid, and (b) monitoring a flow-dependent voltage induced at the electrodes by the passage of conductive liquid through the magnetic field.

These and other aspects of the invention will be apparent from the detailed description below. In no event, however, should the above summaries be construed as limitations on the claimed subject matter, which subject matter is defined solely by the attached claims, as may be amended during prosecution.

DETAILED DESCRIPTION

When used to describe the elevation, location, orientation or motion of elements or liquids in the disclosed devices, words such as "upward", "downward", "higher", "lower", "above", "below" and the like refer to the relative position of an element or liquid portion with respect to another element or liquid portion when the disclosed device is being used in its normal orientation for measurement of liquid flow, and are not intended to require that the disclosed devices should have any particular orientation in space during manufacture or storage.

When used with respect to a liquid flow measurement device, the phrase "gravity-assisted" refers a generally downward liquid flow path from an initial higher elevation upon entry into the device to an eventual lower elevation upon exit from (or settling within) the device.

The phrase "in fluid communication" refers to an available liquid flow path from a first region or location in a device to a second region or location in the device.

The phrase "in enclosed fluid communication" refers to an available enclosed liquid flow path from a first region or location in a device to a second region or location in the device.

When used with respect to a liquid flow measurement device, the phrase "open circuit" refers to a device having an open inlet collector (e.g., a funnel) into which a liquid to be measured is directed.

When used with respect to a liquid flow measurement device, the phrase "closed circuit" refers to a device that is in enclosed fluid communication with a source of liquid to be measured.

The phrase "sensing passage" refers to a conduit or other liquid passageway in which a liquid flow rate is to be determined.

When used with respect to a sensing passage, the phrase "intersecting a magnetic field" refers to an orientation of the sensing passage and a nearby magnetic field such that a voltage will be induced in a conductive liquid as the liquid passes through the sensing passage.

When used with respect to a sensing passage that intersects a magnetic field, the phrase "sensing passage volume" refers to the region between opposing magnet poles that generate the magnetic field.

When used with respect to a sensing passage in a liquid flow measurement device, the phrase "integral trap" refers to a device that as supplied to the user (and without the installation of a wet leg plumbing run or other external trap) has a liquid flow path whose outlet elevation is such that the sensing passage will normally remain filled with liquid after a first use or first rinsing, and will normally only require top-up or replacement of such liquid to accommodate evaporation or cleaning.

When used with respect to a liquid flow measurement device, the word "passive" refers to a device that does not require an external or onboard power supply to measure liquid flow rates. By way of example, liquid flow measurement devices having spinning disks, spinning rotor sensors, or electromagnets but no permanent magnets would not ordinarily be regarded as passive devices. By way of further example, liquid flow measurement devices having electrodes supplied with a biasing voltage and not requiring other external or onboard power may ordinarily be regarded as passive devices.

Figure 1:
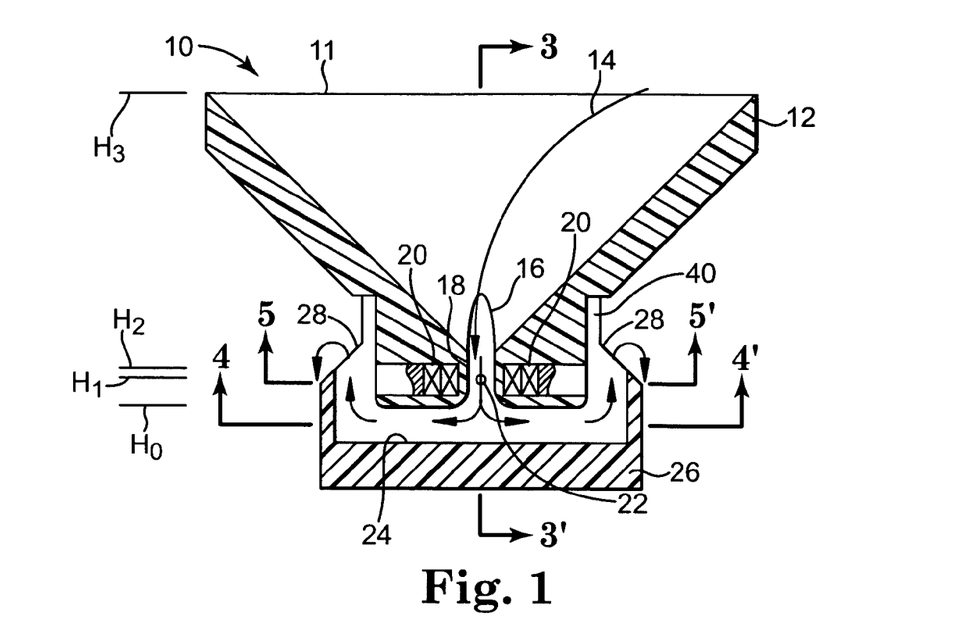
FIG. 1 is a sectional side view of a disclosed flowmeter device.

Referring to FIG. 1, a preferred open circuit embodiment of the disclosed flowmeter is shown in sectional plan view. Flowmeter 10 has an upward-facing generally open inlet 11 having elevation $H_3$. Generally funnel-shaped collector 12 collects a stream of flowing liquid 14 and directs it into opening 16. The collected liquid falls through noncircular sensing passage 18 past generally opposed permanent bar magnets 20 and generally opposed electrodes 22 (one of which is shown in FIG. 1). The electrodes 22 are at elevation $H_1$. Elevation $H_1$ may be lower than elevation $H_3$, a factor that assists in providing rapid gravity-assisted transport of the collected liquid stream past the magnets 20 and electrodes 22. The collected liquid next travels through generally horizontal passageway 24 in base 26, and exits flowmeter 10 through exit openings 28. The lowermost edges of outlet openings 28 are at elevation $H_2$ and the top of passageway 24 is at elevation $H_0$. Elevation $H_2$ is sufficiently higher than elevation $H_0$ so that the sensing passage volume normally remains filled with liquid. This permits passageway 24 to function as part of a generally annular integral trap with (in this embodiment) multiple outlets. By providing an integral trap, installation errors may be reduced. Passageway 24 directs the flow of liquid outwardly with respect to sensing passage 18. Capillary forces, sensing passage surface treatments or other suitable measures may be relied on or employed to encourage liquid in sensing passage 18 to fill the sensing passage volume. By maintaining standing liquid (e.g., the detected liquid, or water or other liquid that may have been used to rinse flowmeter 10) in sensing passage 18 at a height sufficient to fill the sensing passage volume, the flowmeter's response may be made more rapid and more accurate, particularly during the early stages of a short duration liquid discharge. Preferably outlet elevation $H_2$ is approximately equal to the elevation of the top of sensing passage 18, and is not so high as to cause excessive back pressure downstream from sensing passage 18. Also, elevation $H_0$ preferably is below sensing passage 18.

The liquid can be collected in a suitable receptacle or discarded. For example, flowmeter 10 may be used to measure urine flow, and may be mounted or suspended over or in a toilet bowl (not shown in FIG. 1) so that the liquid falls from the flowmeter into the toilet bowl during use. Flowmeter 10 may be used to measure the flow of a variety of other conductive liquids, and is especially useful for measuring the flow rate of falling liquid streams having low total volume or short duration. Passageway 24 and the openings 28 may for example be sufficiently large to minimize back pressure and to avoid delayed removal of the falling liquid stream from sensing passage 18, but sufficiently small to provide rapid flowmeter response.

Figure 2:
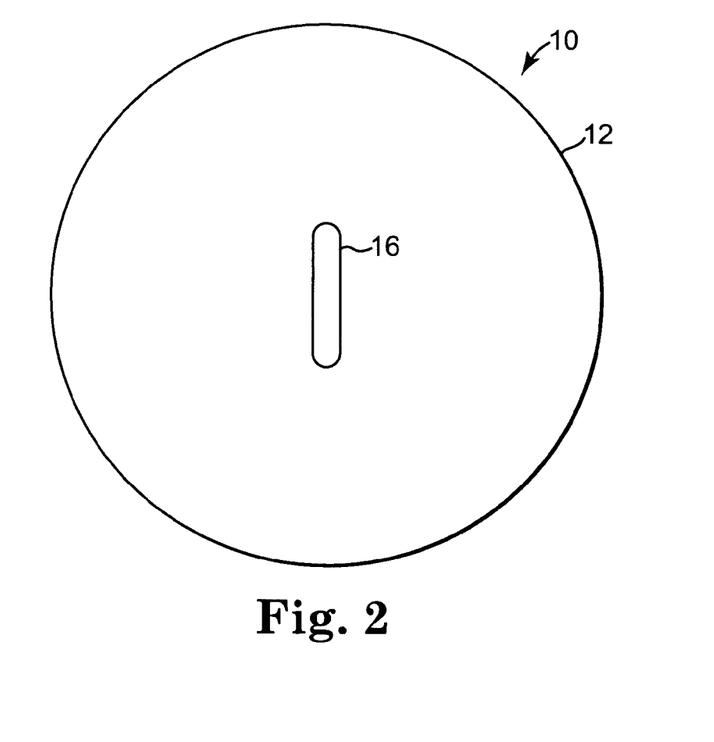
FIG. 2 is a plan view of the FIG. 1 device.

FIG. 2 shows a plan view of collector 12. Opening 16 is generally elongated and may be made sufficiently large to minimize back pressure and liquid buildup in collector 12 and delayed delivery of the falling liquid stream to sensing passage 18.

Figures 3, 4, 5:
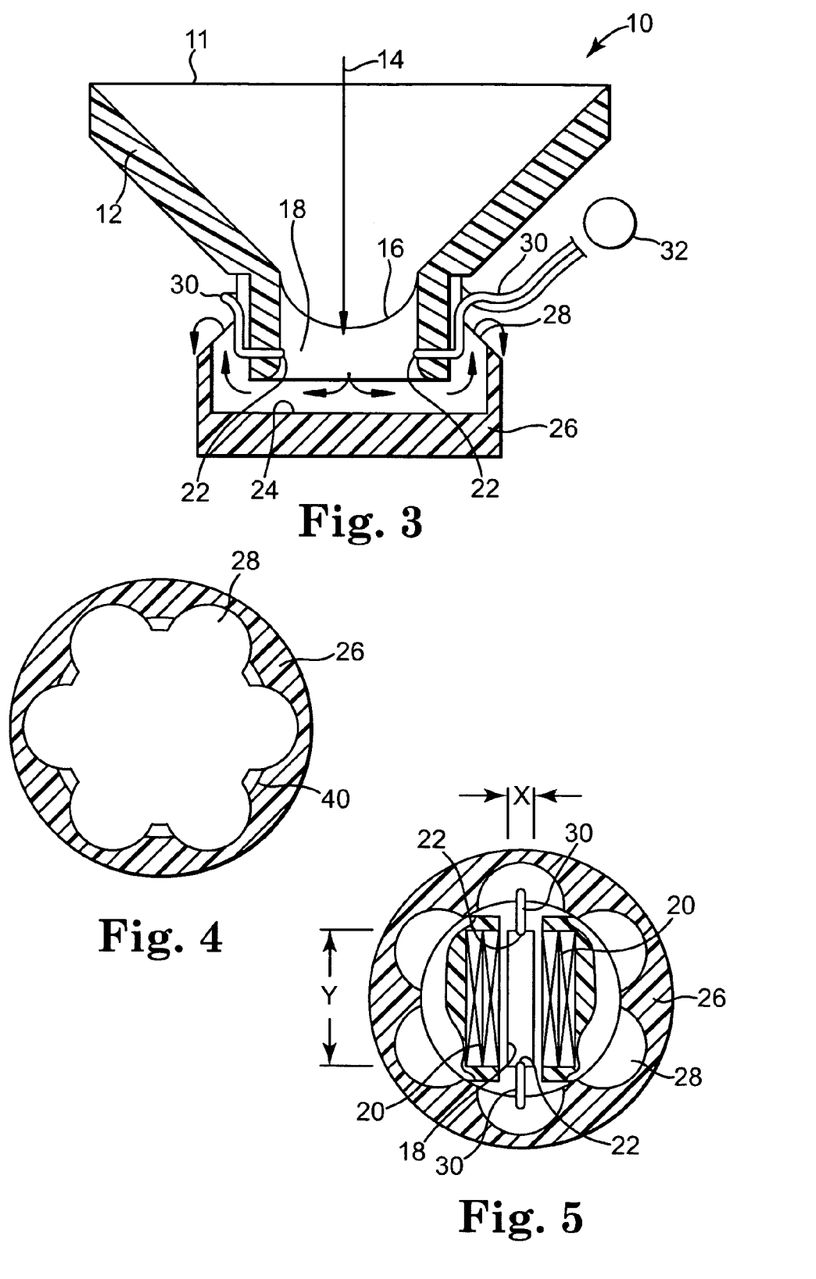
FIG. 3 is a sectional side view of the FIG. 1 device, taken along the line 3–3'.
FIG. 4 is a sectional plan view of the FIG. 1 device, taken along the line 4–4'.
FIG. 5 is a sectional plan view of the FIG. 1 device, taken along the line 5–5'.

FIG. 3 is a sectional side view of flowmeter 10 taken through line 3–3' in FIG. 1. The generally opposed relationship of electrodes 22 may more readily be seen in FIG. 3 than in FIG. 1. Leads 30 permit voltage readings from electrodes 22 to be connected to a voltmeter or other suitable electronic circuit 32. The design and construction of such a circuit (and associated software, if any) will be familiar to those skilled in the art.

When liquid passes through the magnetic field between magnets 20, a flow-dependent voltage is induced between electrodes 22. The liquid flow rate may be calculated based on Faraday's law of magnetic induction (which states that the voltage induced across a conductor as it moves at right angles through a magnetic field is proportional to the conductor's velocity), using the equation:

$$V = B \times D \times c$$

where
 V is the detected voltage (Volts)
 B is the magnetic flux density (Tesla)
 D is the distance between the electrodes (mm) and
 c is the mean flow velocity (mm/sec).

FIG. 4 is a sectional plan view taken along line 4–4' in FIG. 1. Openings 28 are arranged around base 26 and between projections 40. Projections 40 grip collector 12 (e.g., using a friction fit) and may permit disassembly of collector 12 and base 26 if desired (e.g., for cleaning or maintenance).

FIG. 5 is a sectional plan view taken along line 5–5' in FIG. 1. Sensing passage 18 has a minor axis X and major axis Y. Minor axis X is generally aligned with the permanent magnetic field between magnets 20, and for a given cross-sectional area in sensing passage 18 will provide a stronger magnetic field through sensing passage 18 than would be the case if sensing passage 18 were circular. Major axis Y is generally aligned with electrodes 22, and for a given cross-sectional area in sensing passage 18 will provide a longer signal path than would be the case if sensing passage 18 had a circular cross-section. Both the short X axis and the long Y axis may contribute to improved flowmeter sensitivity or accuracy.

Figure 6:
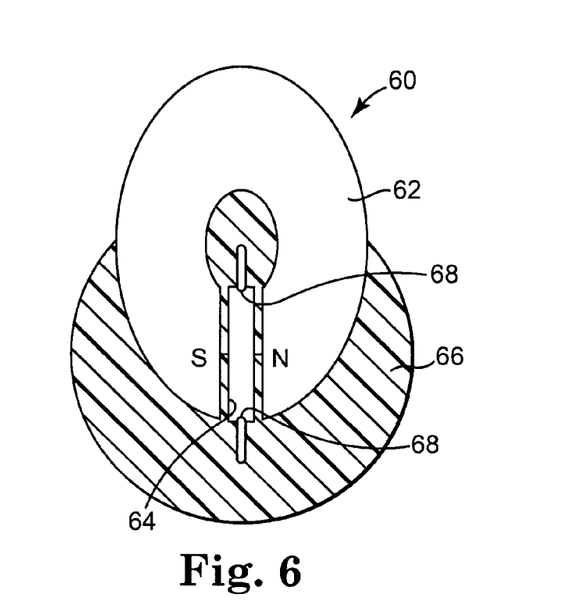
FIG. 6 is a sectional plan view of a disclosed device employing a horseshoe magnet.

FIG. 6 shows a sectional plan view taken through the magnet portion of another disclosed flowmeter 60. Horseshoe magnets 62 may provide a stronger magnetic field through sensing passage 64 then might normally be achieved using bar magnets such as magnets 22. A stronger magnetic field may permit more latitude in the design of electrodes 68 or in the associated electronic circuitry. Suitable cutouts or other reliefs may be formed in base 66 to accommodate magnet 62.

Figures 7, 8:
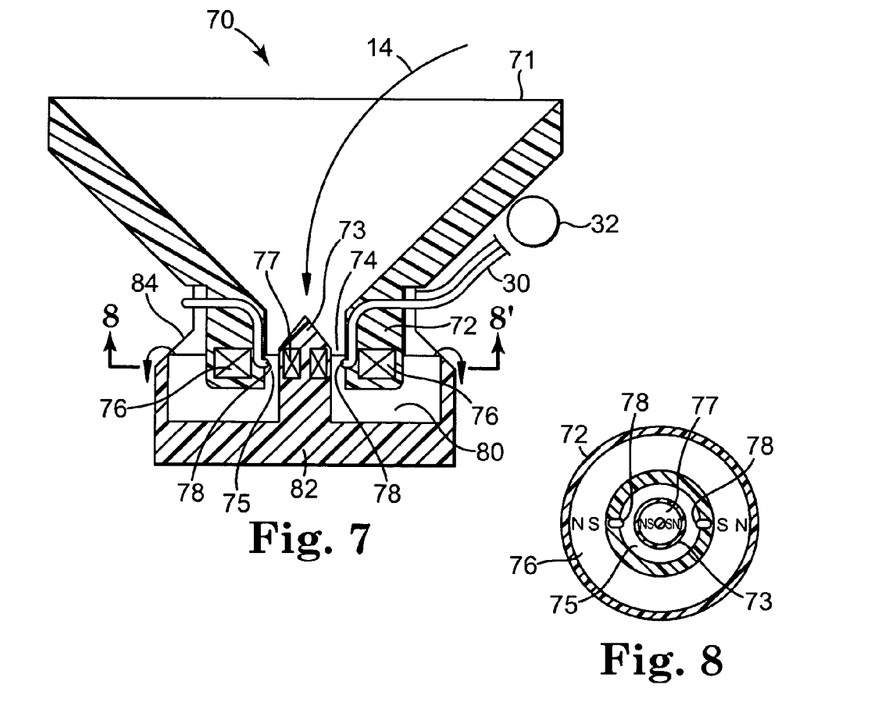
FIG. 7 is a sectional side view of a disclosed device employing ring magnets.
FIG. 8 is a sectional plan view of the FIG. 7 device, taken along the line 8–8'.

FIG. 7 shows a sectional side view of another disclosed flowmeter 70, and FIG. 8 shows a sectional plan view taken along line 8–8' in FIG. 7. Flowmeter 70 has an upward-facing generally open inlet 71. Generally funnel-shaped liquid collector 72 collects a stream of falling liquid 14 and directs it past central post 73 into opening 74. The collected liquid falls through sensing passage 75 past permanent ring magnet 76 (mounted in collector 72), permanent ring magnet 77 (mounted in post 73) and generally opposed electrodes 78. The collected liquid next travels through generally horizontal passageway 80 in base 82, and exits flowmeter 70 through openings 84. Magnets 76 and 77 may be disposed in an annular arrangement that may provide a compact sensing passage that intersects a high strength magnetic field.

Figure 9:
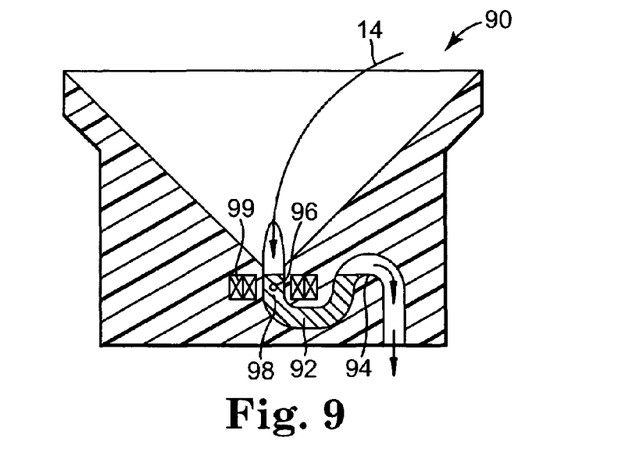
FIG. 9 is a sectional side view of a disclosed flowmeter device employing an integral trap.

FIG. 9 shows a sectional side view of another disclosed flowmeter 90. Flowmeter 90 includes an integral, generally planar trap section 92 whose outlet 94 has an elevation sufficient to fill the sensing passage volume with conductive liquid following the flowmeter's first use or rinsing. This may contribute to improved flowmeter accuracy or faster response.

Figure 10:
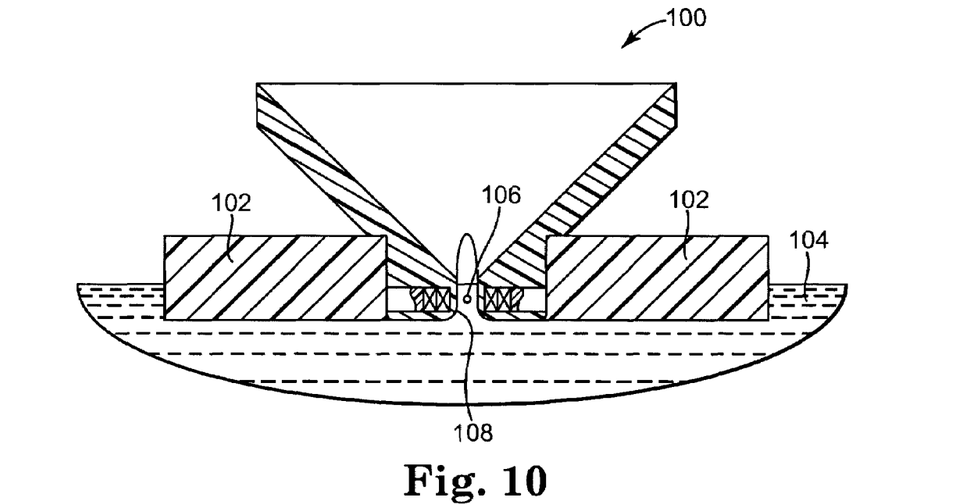
FIG. 10 is a sectional side view of a disclosed floating flowmeter device having a submerged sensing passage.

FIG. 10 shows a sectional side view of another disclosed flowmeter 100. Flowmeter 100 has floats 102 that permit flowmeter 100 to rest upon the surface of water 104 (e.g., in a toilet bowl, not shown in FIG. 10) and fill the sensing passage volume.

Figure 11:
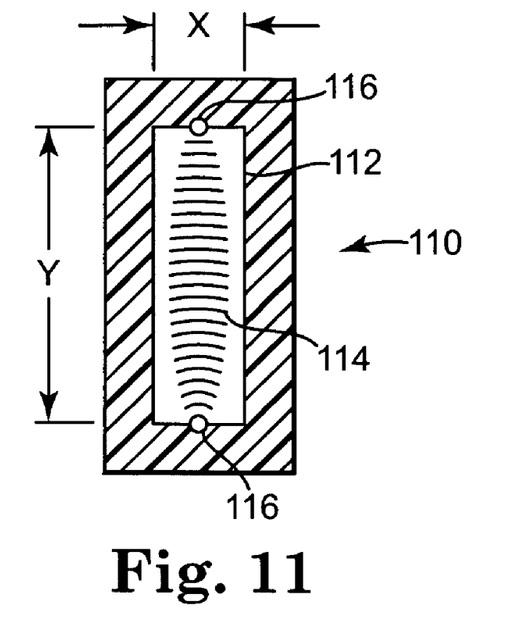
FIG. 11 is a cross-sectional view of a rectangular sensing passage.
Figure 12:
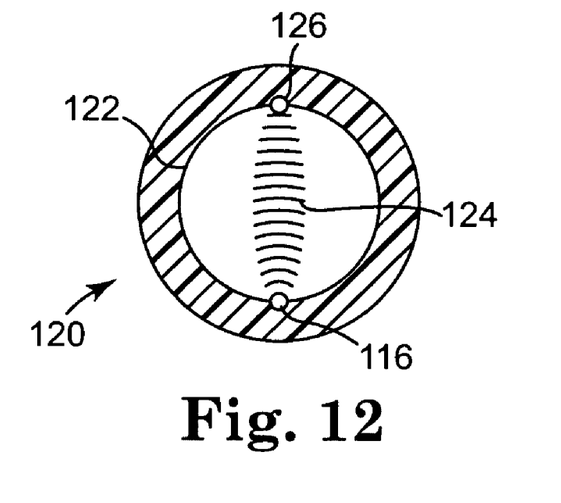
FIG. 12 is a cross-sectional view of a circular sensing passage.

The sensing passage can have a variety of shapes and sizes. For example, FIG. 11 shows a portion of a flowmeter 110 whose sensing passage 112 has a rectangular cross-section. Minor axis X is generally aligned with an applied magnetic field 114 (shown schematically in FIG. 11) and major axis Y generally aligned with electrodes 116. As a further example, FIG. 12 shows a portion of a uroflowmeter 120 whose sensing passage 122 has a circular cross-section. Applied magnetic field 124 (shown schematically in FIG. 12) is generally orthogonal to the axis defined by electrodes 126 and the flow of liquid through sensing passage 122. Other sensing passage shapes (e.g., ovals, ellipses or dog-bone shapes, or elongated openings with generally straight sides and rounded corners, e.g., as shown in FIG. 5) can readily be envisioned by those skilled in the art.

The disclosed flowmeters may be manufactured in a variety of shapes and sizes. For example, for use as a uroflowmeter, the flowmeter shown in FIG. 1 may have an inlet diameter of about 10 to about 40 cm (e.g., about 30 cm), and a base diameter (viz., the diameter of a cross-section taken through the sensing passage midpoint, perpendicular to the liquid flow direction) of about 10 to about 60 mm (e.g., about 40 mm). The sensing passage volume may be relatively large (e.g., 10 cm$^3$ or more) for general flowmeter use and relatively small (e.g., 1 cm$^3$ or less) for uroflowmeter use. The noncircular sensing passage in such a uroflowmeter may for example be an ellipse or oval having a minor axis X of about 1 to about 5 mm (e.g., about 3 mm), and a major axis Y of about 5 to about 20 mm (e.g., about 13 mm). The integral trap in such a uroflowmeter may have a variety of shapes and may for example have a volume of about 1 to about 5 cm$^3$ (e.g., about 2 cm$^3$). Additional details regarding uroflowmeters may be found in copending application Ser. No. 10/837,032 filed even date herewith, the disclosure of which is incorporated herein by reference. Additional details regarding passive noncircular sensing passage flowmeters may be found in copending application Ser. No. 10/837,031 filed even date herewith, the disclosure of which is incorporated herein by reference.

Figure 13:
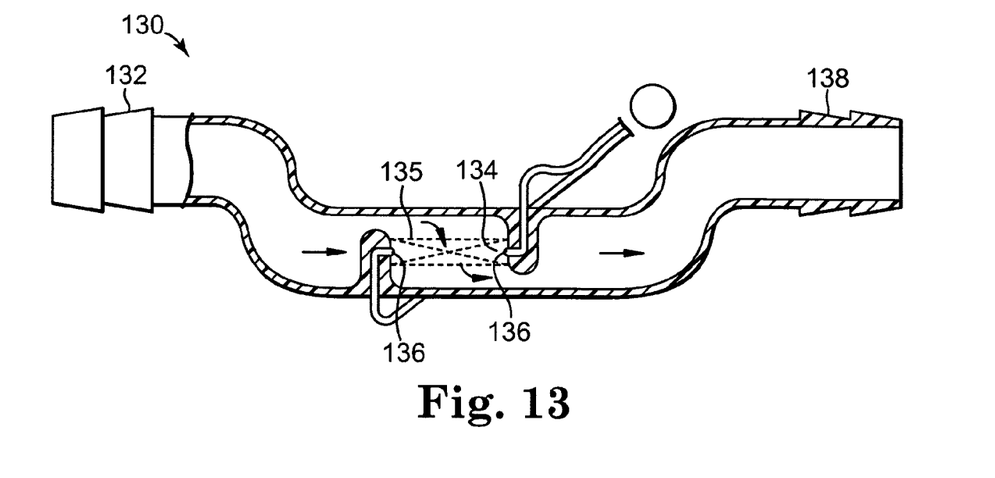
FIG. 13 is a sectional side view of an additional disclosed flowmeter device.

The disclosed flowmeters may be open circuit devices such as the device shown in FIG. 1. The disclosed flowmeters may also be closed circuit devices that may be used to measure single or recirculating liquid flows. For example, FIG. 13 shows a closed circuit generally U-shaped flowmeter 130 having inlet nipple 132, sensing passage 134, permanent magnet 135 (shown in phantom), electrodes 136 and outlet nipple 138. The sensing passage in flowmeter 130 has a lower elevation than the inlet nipple 132 and outlet nipple 138, and normally remains filled with conductive liquid following the first use or rinsing of flowmeter 130. The sensing passage in flowmeter 130 may have a variety of noncircular cross-sections, such as the rectangular shape shown in FIG. 11 or the circular shape shown in FIG. 12.

Figure 14:
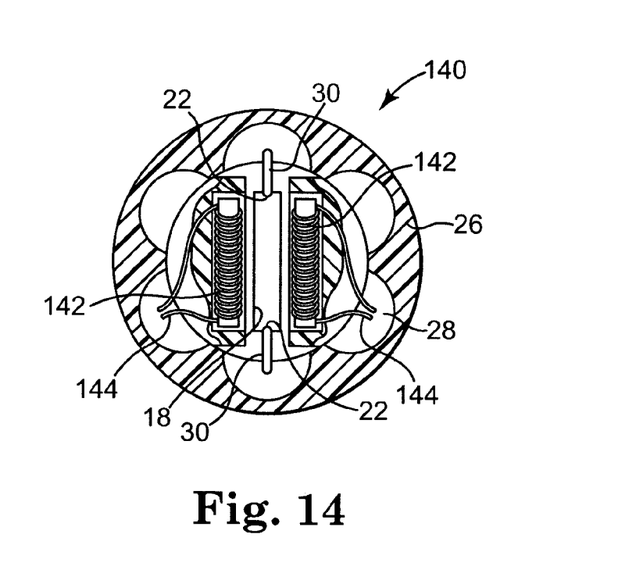
FIG. 14 is a sectional plan view of a disclosed device employing electromagnets.

The disclosed flowmeters may be used to measure a variety of flow rates, e.g. from about 0.5 ml/sec to about 0.5 liters/sec or more, depending on the distance between the magnet poles and the available electromagnetic or permanent magnetic strength. The flowmeter body may be manufactured from a variety of transparent or opaque materials, including plastics (e.g., polyethylene, polypropylene, polyvinyl chloride, polycarbonate or ABS), nonmagnetic metals (e.g., aluminum, brass or nonmagnetic stainless steel), glasses or ceramics (e.g., porcelain). The magnets may be made from a variety of materials, e.g, NdFeB (neodymium-iron-boron), ferrite, AlNiCo (aluminum-nickel-cobalt) and SmCo (samarium cobalt). The magnets may also be electromagnets or a combination of both permanent magnets and electromagnets. The permanent magnets may have magnetic strengths ranging for example from about 0.5 Tesla to about 1.5 Tesla (e.g., 1.3 Tesla) as measured at a pole surface. Passive transducers having a sufficiently strong permanent magnetic field to carry out flow rate measurements are especially preferred, as they do not require excitation power and may employ only direct current sensing connections, thus reducing isolation requirements. If equipped with an electromagnet, the disclosed flowmeters may employ an internal or external power source. FIG. 14 is a sectional plan view of a disclosed flowmeter 140 employing components like those shown in the flowmeter of FIG. 5 but using electromagnets 142 in place of permanent magnets 20. Electromagnets 142 may be energized via leads 144.

The electrodes may be made from a variety of materials. Suitable materials include corrosion-resistant materials such as gold or silver; gold- or silver-plated metals (e.g., silver-plated brass or copper, with the silver plating preferably being oxidized); or less corrosion-resistant (but also less expensive) materials such as copper or brass.

The disclosed flowmeters may be disposable or reusable. Owing to the simplicity of the design and the relatively compact dimensions that may be employed, the disclosed flowmeters are particularly well-suited for disposable use. The disclosed flowmeters may include a separate or detachable (and optionally disposable) inlet funnel. The disclosed flowmeters may also include a receptacle or other large reservoir to collect all of the discharged liquid. Preferably the disclosed flowmeters do not include such a reservoir and do not require emptying or other maintenance beyond a simple rinsing step. Preferably the disclosed flowmeters do not have moving parts or resilient seals. The disclosed flowmeters may however include fixing devices, stands or other components that facilitate the flowmeter's mounting or use, e.g., by mounting or supporting the flowmeter on or over a drain. If used for uroflowmetry and mounted or supported on, in or over a toilet, the flowmeter may be mounted or supported in such a way that it automatically will be rinsed when the toilet is flushed.

Various modifications and alterations of this invention will be apparent to those skilled in the art without departing from the scope and spirit of this invention. It should be understood that this invention is not limited to the illustrative embodiments set forth above.

I claim:

1. An integral trap magnetic flowmeter comprising an inlet in fluid communication with a sensing passage, the sensing passage intersecting a magnetic field, having electrodes for detecting a flow-dependent voltage induced by the passage of conductive liquid through the magnetic field, and having an outlet at an elevation such that the sensing passage volume normally remains filled with conductive liquid.

2. A flowmeter according to claim 1 having a generally downward gravity-assisted flow of liquid from the inlet to the outlet.

3. A flowmeter according to claim 1 wherein the sensing passage has a top having an elevation approximately equal to the outlet elevation.

4. A flowmeter according to claim 1 comprising an integral trap comprising a generally horizontal passage having a top whose elevation is below the sensing passage.

5. A flowmeter according to claim 4 wherein the trap is generally annular and directs the flow of liquid outwardly with respect to the sensing passage.

6. A flowmeter according to claim 4 wherein the trap has multiple outlets.

7. A flowmeter according to claim 4 wherein the trap has a volume of about 1 to about 5 cm$^3$.

8. A flowmeter according to claim 1 wherein the sensing passage has a volume less than about 1 cm$^3$.

9. A flowmeter according to claim 1 wherein the electrodes have a lower elevation than the inlet.

10. A flowmeter according to claim 1 comprising a passive device that does not require an external or onboard power supply to measure liquid flow rates.

11. A flowmeter according to claim 1 wherein the magnetic field is provided by one or more permanent magnets.

12. A flowmeter according to claim 1 wherein the magnetic field is provided by one or more electromagnets.

13. A flowmeter according to claim 1 having a body comprising plastic.

14. A flowmeter according to claim 1 that does not include a reservoir to collect all of the conductive liquid.

15. A flowmeter according to claim 1 that floats when permitted to rest upon the surface of the liquid and thereby fills the sensing passage volume.

16. A flowmeter according to claim 1 further comprising a fixing device, stand or other component that mounts or supports the flowmeter on, in or over a drain.

17. A flowmeter according to claim 1 comprising an open circuit device having an open inlet collector into which the liquid is directed.

18. A flowmeter according to claim 1 comprising a closed circuit device in enclosed fluid communication with a source of the liquid.

19. A flowmeter according to claim 18 having a generally U-shaped configuration.

20. A flowmeter according to claim 18 wherein the sensing passage has a top having a lower elevation than the inlet and outlet.

21. A flowmeter according to claim 1 having no moving parts or resilient seals.

22. A method for measuring liquid flow comprising (a) passing a stream of conductive liquid through an integral trap magnetic flowmeter comprising an inlet in fluid communication with a sensing passage, the sensing passage intersecting a magnetic field, having electrodes for detecting a flow-dependent voltage induced by the passage of conductive liquid through the magnetic field, and having an outlet at an elevation such that the sensing passage volume normally remains filled with conductive liquid, and (b) monitoring a flow-dependent voltage induced at the electrodes by the passage of conductive liquid through the magnetic field.

23. A method according to claim 22 wherein there is a generally downward gravity-assisted flow of liquid from the inlet to the outlet.

24. A method according to claim 22 wherein the sensing passage has a top having an elevation approximately equal to the outlet elevation.

25. A method according to claim 22 wherein the flowmeter comprises an integral trap comprising a generally horizontal passage having a top whose elevation is below the sensing passage.

26. A method according to claim 25 wherein the trap is generally annular and directs the flow of liquid outwardly with respect to the sensing passage.

27. A method according to claim 25 wherein the trap has multiple outlets.

28. A method according to claim 25 wherein the trap has a volume of about 1 to about 5 cm$^3$.

29. A method according to claim 22 wherein the sensing passage has a volume less than about 1 cm$^3$.

30. A method according to claim 22 wherein the electrodes have a lower elevation than the inlet.

31. A method according to claim 22 wherein the flowmeter comprises a passive device that does not require an external or onboard power supply to measure liquid flow rates.

32. A method according to claim 22 wherein the magnetic field is provided by one or more permanent magnets.

33. A method according to claim 22 wherein the magnetic field is provided by one or more electromagnets.

34. A method according to claim 22 wherein the flowmeter comprises a body comprising plastic.

35. A method according to claim 22 wherein the flowmeter does not include a reservoir to collect all of the conductive liquid.

36. A method according to claim 22 further comprising floating the flowmeter upon the surface of a liquid and thereby filling the sensing passage volume.

37. A method according to claim 22 further comprising mounting or supporting the flowmeter on, in or over a drain so that the liquid falls from the flowmeter into the drain.

38. A method according to claim 22 wherein the flowmeter comprises an open circuit device having an open inlet collector into which the liquid is directed.

39. A method according to claim 22 wherein the flowmeter comprises a closed circuit device in enclosed fluid communication with a source of the liquid.

40. A method according to claim 39 wherein the flowmeter has a generally U-shaped configuration.

41. A method according to claim 39 wherein the sensing passage has a top having a lower elevation than the inlet and outlet.

42. A method according to claim 22 wherein the flowmeter has no moving parts or resilient seals.

* * * * *